June 28, 1932. J. M. P. IDRAC 1,865,373
APPARATUS FOR RECORDING THE DIRECTION AND SPEED OF FLUID CURRENTS
Filed May 24, 1928
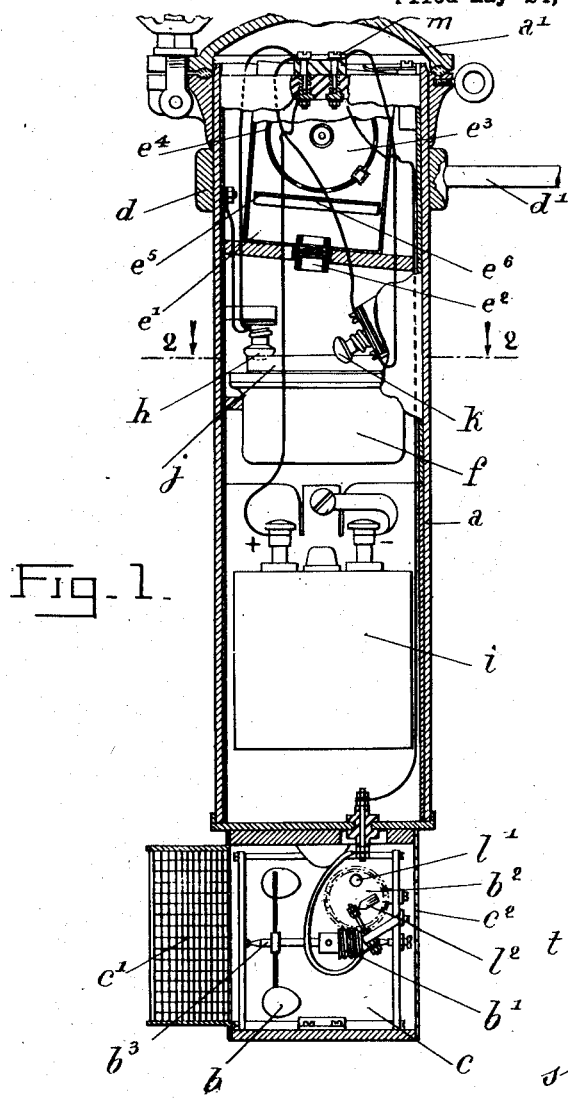
Fig_1
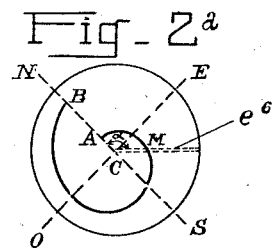
Fig_2ª
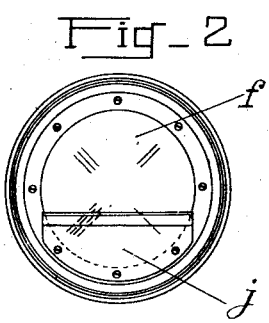
Fig_2
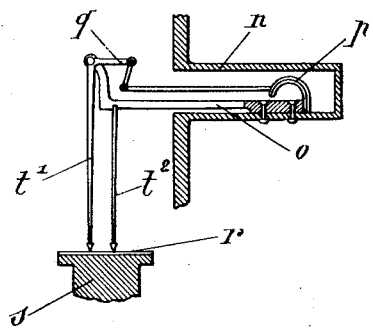
Fig_3
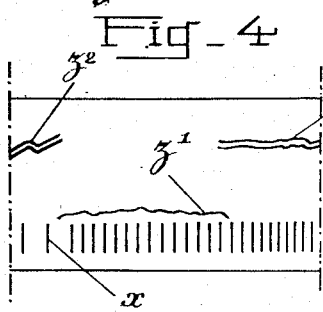
Fig_4
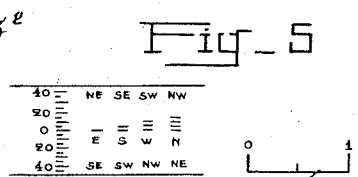
Fig_5
Inventor
Jean M. P. Idrac
By C. F. Wenderoth, Atty.

Patented June 28, 1932

1,865,373

UNITED STATES PATENT OFFICE

JEAN MARIE PIERRE IDRAC, OF PARIS, FRANCE

APPARATUS FOR RECORDING THE DIRECTION AND SPEED OF FLUID CURRENTS

Application filed May 24, 1928, Serial No. 280,338, and in Belgium June 1, 1927.

The present invention relates to apparatus for registering the movements of a rotating element, and it relates more particularly, although not exclusively, to apparatus of this class adapted for recording the direction and speed of fluid currents.

The said invention consists chiefly in arranging the said apparatus in such manner that it will comprise the following parts.

The apparatus comprises one or more movable indicating members which are movable in a plane and are actuated by a rotating element, and which are adapted to produce, when photographed, an image which is distinguished from the back ground of the photograph. An opaque screen is placed parallel with the said plane, and it has a suitably disposed slit. The apparatus further comprises a photographic arrangement having a movable sensitive member disposed for the continuous recording of the position in the rear of the said slit, of the said movable indicating number, whereby the position of the axis of the rotating element will be recorded.

In addition to the aforesaid general arrangement, the apparatus comprises certain other dispositions which may be used according to circumstances and which will be further described, and chiefly of a second arrangement which is exclusively adapted for use in apparatus for registering the direction and speed of fluid currents. For this purpose, I combine with the apparatus of the above-mentioned class, suitable means for recording the temperature of the said currents, and I employ in said apparatus a photographic device adapted for the simultaneous recording on a single surface of the data relative to the direction, speed and temperature of the current under observation.

The following description with reference to the appended drawing which is given by way of example shows various embodiments of the invention.

Figures 1 and 2 are respectively a lengthwise axial section and a cross section on the line 2—2 of Figure 1, of an apparatus for measuring and recording the direction and the speed of submarine currents, according to the invention. Figure 2ª shows a modified form of the compass dial, employed in a modification of the apparatus. Figure 3 is a lengthwise section of a unit which may be combined with the apparatus shown in Figs. 1 and 2. Figure 4 shows a finished photographic record obtained with an apparatus combined with an instrument analogous to the one shown in Figs. 1 and 2. Figure 5 shows a movable scale for the determination of certain characteristics of the photographic record shown in Figure 4.

In a form of construction which is chiefly applicable to the registering of the speed of submarine currents, the said apparatus may comprise the following parts.

The case $a$ is hermetically closed by a cover $a^1$, and in which are disposed the different parts which will be herein after more explicitly described and which provide for the automatic registering, by means of photography, of the desired indications: said box has preferably the form of a vertical tube, closed at both ends, the thickness of the walls being sufficient to resist high pressures.

The element such as a vane wheel $b$ is disposed (preferably) at the lower part of the case $a$ and is rotated by the current at a speed which is a known function of the speed of said current; the motion of the said element is imparted through the worm $b^1$ to a worm wheel $b^2$ which opens or closes the circuit for the intermittent lighting of a reflecting plate adapted to act upon a traveling sensitive band of a photographic apparatus, as will be further specified; the speed of rotation of the worm wheel $b^2$ is therefore a known function of the speed of the fluid current which acts upon the vane wheel $b$.

Means are provided for turning the main axial plane of the apparatus passing through the longitudinal axis $b^3$ of the vane wheel $b$, parallel with the axis of the current, and said means may consist of a conduit $c$ having a horizontal axis and for instance a rectangular cross section. The said conduit supports the several elements rotated by the vane wheel $b$. The wall through which the current enters consists of two perforated faces $c^1$ forming a vertical dihedral angle of suitable valve (for instance 90°), whilst the perforated wall $c^2$ through which the current issues from the apparatus may be placed across the said conduit.

Means are further provided for absorbing the vibrations or jarring due to the apparatus itself. Such means may consist of a collar $d$ disposed on the upper part of the tube $a$ and carrying a rod $d^1$ disposed in the main axial plane of the apparatus in the direction of the current, and extended by a cable or cord of relatively great length (for instance 5 to 6 meters).

Suitable means (not shown) are provided for connecting the apparatus with a cable or the like, whereby it may be immersed to the depth which is to be explored.

In the interior of the box is disposed a photographic apparatus for recording the indications of the speed and direction of the fluid current upon the sensitive band. The said apparatus is properly mounted and suitably constructed, for instance as shown in the drawing and in the known manner; the apparatus thus comprises the chamber $a^1$, the lens $e^2$ and a rotatable support $e^3$ provided with clockwork, for displacing the sensitive band $e^4$ in a continuous manner, and I dispose, according to the invention, between the lens $e^1$ and the support $e^3$ a screen $e^5$ in which is formed the slot $e^6$ which is perpendicular to the direction of travel of the band and is situated on the axis of the optical system $e^2$.

In the said case is further disposed the compass $f$ which is preferably astatic and is provided with liquid damping; the face of said compass is placed opposite the said lens $e^2$ and carries indications corresponding to the principal compass joints, said indications being such that they will form images of a different character upon the sensitive band, and for this purpose the said indications may consist of a certain number of radial lines; for instance a single line represents the east, two parallel lines south, three lines west and four lines north. The dial of the said compass is constantly lighted by a lamp $h$ supplied with current from a suitable source such as a storage battery $i$. To provide for the photographing of the indications showing the direction of the instrument relatively to the compass frame, the optical axis of the lens is disposed in the main axial plane of the instrument and is turned towards the part of the compass which is lighted by the lamp $h$, and said axis (Figure 1) may be suitably inclined from the longitudinal axis of the instrument, or may be parallel therewith, and in the latter case it may be spaced from the said longitudinal axis by a suitable distance which can be readily determined by experience.

The case of the instrument further contains a reflecting surface $j$, for instance a metal plate coated with a white substance, and covering the lateral part of the dial with reference to its main axial plane, in such manner that the said plate, or at least a part of it, will be situated in the field of the lens and that when the said plate is intermittently lighted it will act upon the sensitive band of the photographic apparatus, and will thus register a line upon the said band at each illumination of the said plate. The intermittent lighting by means of the electric lamp $k$ being controlled by the gear wheel $b^2$ actuated by the vane wheel $b$. For this purpose, the circuit of the said lamp—supplied by any suitable source and preferably a storage battery $i$—comprises an automatic contact device whereof one of the operative elements such as the contact piece $l^1$ is mounted on the wheel $b^2$ and insulated therefrom, and the other operative element, such as a fixed contact plate $l^2$, is adapted to make contact with the said contact piece at each revolution of the wheel $b^2$; the contact piece $l^1$ is connected with one terminal of the storage battery and the lamp $k$ is placed in the circuit, as well as the switch $m$, thus connecting the contact plate $l^2$ with the other terminal of the battery $i$.

The functioning of the entire apparatus is as follows.

The apparatus is supposed to be immersed in a current of water whose speed and direction are to be found. The lamp $h$ lights the compass dial in a continuous manner, and the lamp $k$ is temporarily extinguished. A sensitive film, paper band or the like, is placed on the periphery of the rotating drum $e^3$.

The vane wheel $b$ is rotated by the current of water, and the apparatus will automatically turn into such a position that its longitudinal axial plane is parallel with the flow of the current. Due to the rotation of the wheel $b^2$, the lamp $k$ is lighted for the proper time so that the image of a portion of the plate $j$ will be produced on the sensitive band in the form of a line $x$ (Figure 4) due to the interposed screen $e^5$ containing the slit $e^6$.

The series of lines thus formed will afford means for determining the speed of the current, and such lines will be more closely spaced according as the speed of the current is greater, so that I may readily find this speed, for instance in knots, per unit of time, for example per hour, by forming upon a movable scale (Fig. 5), preferably transparent, a graduated part $y$ according to the time —which depends essentially upon the speed with which the sensitive band moves before the lens—and I thus place the said scale upon the band after it has been developed and fixed, for the direct and ready determination of the speed of the current during a given time.

The data relative to the orientation of the apparatus are shown on the sensitive band in the form of one or more continuous lines extending upon the whole width of the band said lines consisting of one, two, three or four parallel lines, according as the apparatus occupies the east, south, west, or north position. In the example shown in Figure 4, the orientations indicated correspond in the part $z^1$ to the south direction, and in the part $z^2$ to the east direction.

Furthermore, the relative position of the lines $z^1$ or $z^2$ relatively to the width of the band indicates the deviation of the instrument with reference to the principal directions above mentioned, and said deviation according as the marks on the compass dial are more or less spaced from the centre of the axis of the optical system of the photographic apparatus will cause the images of said marks to be more or less spaced from the longitudinal axis of the sensitive band.

The maximum spacing is about 45° in either direction, and at the time when view of these lines, for instance $z^1$, leaves the optical field of the apparatus, the other line, for instance $z^2$ will enter this field.

By the use of the scales shown in Figure 5, I may thus find the exact orientation of the instrument, by measuring the distance between the line $z^1$ (or $z^2$) and the middle line of the band, which corresponds to the zero of the scale.

In a modification of the compass dial, I give to the marks the form of one or more arcs of a spiral, as shown in Figure 2ª. The origin of the arc of the spiral is, for instance at the point A corresponding to the north, and the end B is in the same direction but corresponds to a 360° rotation of the apparatus. Since the length of the vector CM is at each point a function of the angle formed, the orientation of the apparatus will be automatically given by the position, on the band, of the projection of the point M, so that the variations in the direction of the apparatus will be recorded in the form of a straight line.

The operation will thus be as above stated, or I may preferably add the following device, which may be used separately if necessary.

With an apparatus for recording the direction and speed of fluid currents, I combine means for recording the temperature of such currents, and also a photographic device which provides a photographic band or the like upon which may be simultaneously recorded the direction, speed and temperature of the current, and such means may consist, when an apparatus as shown in Figures 1 and 2 is employed, of the following parts.

A conduit $n$ of small size is radially mounted on the lateral wall of the tight case $a$, said conduit being closed at one end and communicating with the interior of the said case. The stationery support $o$ is suitably mounted in the said case and is engaged in the conduit $n$. The thermometer $p$ consisting of two metal strips, gives indications which are amplified by the set of levers $q$ and are recorded —through the pointed member $t^1$—upon a sheet of paper or the like $r$ which may be coated with lampblack; said sheet may be mounted on a drum $s$ which is driven by clockwork, and the records are preferably made at the same time as the records made by means of a fixed marking point $t^2$ mounted on the stationary support $c$.

The records on the sheet $r$ may be read directly by means of an aperture, or after removing the sheet from the drum, but I prefer to dispose the said sheet so that it will be situated in the field of the photographic lens $e^1$, or that its image will be reflected in such manner that it will be projected upon the sensitive band $e^4$.

Having now particularly described my invention and in what manner the same is to be performed, I claim as my invention:

1. In an apparatus designed for recording the characteristics of ocean currents, a closed housing adapted to withstand high pressures, an orienting tail member upon said housing, a continuously unwinding photographic film in said housing, a photographic lens, a fixed disc having an opening therein, said opening being arranged so as to produce impressions upon the photographic film, said impressions being upon the one hand the dial of a compass and upon the other hand a surface illuminated intermittently, and a screw propeller upon said housing positioned in the current, an interrupter operated by said screw propeller and said interrupter accomplishing the intermittent illumination.

2. In an apparatus according to claim 1 the arrangement of the recording elements in the interior of a tight box, vertically suspended, the screw-like propeller wheel being arranged beyond the tight box and having its shaft horizontal.

In testimony whereof I have signed my name to this specification.

JEAN MARIE PIERRE IDRAC.